I. Z. ZELMA.
CLUTCH.
APPLICATION FILED SEPT. 14, 1912.
1,058,681.
Patented Apr. 8, 1913.
2 SHEETS—SHEET 1.
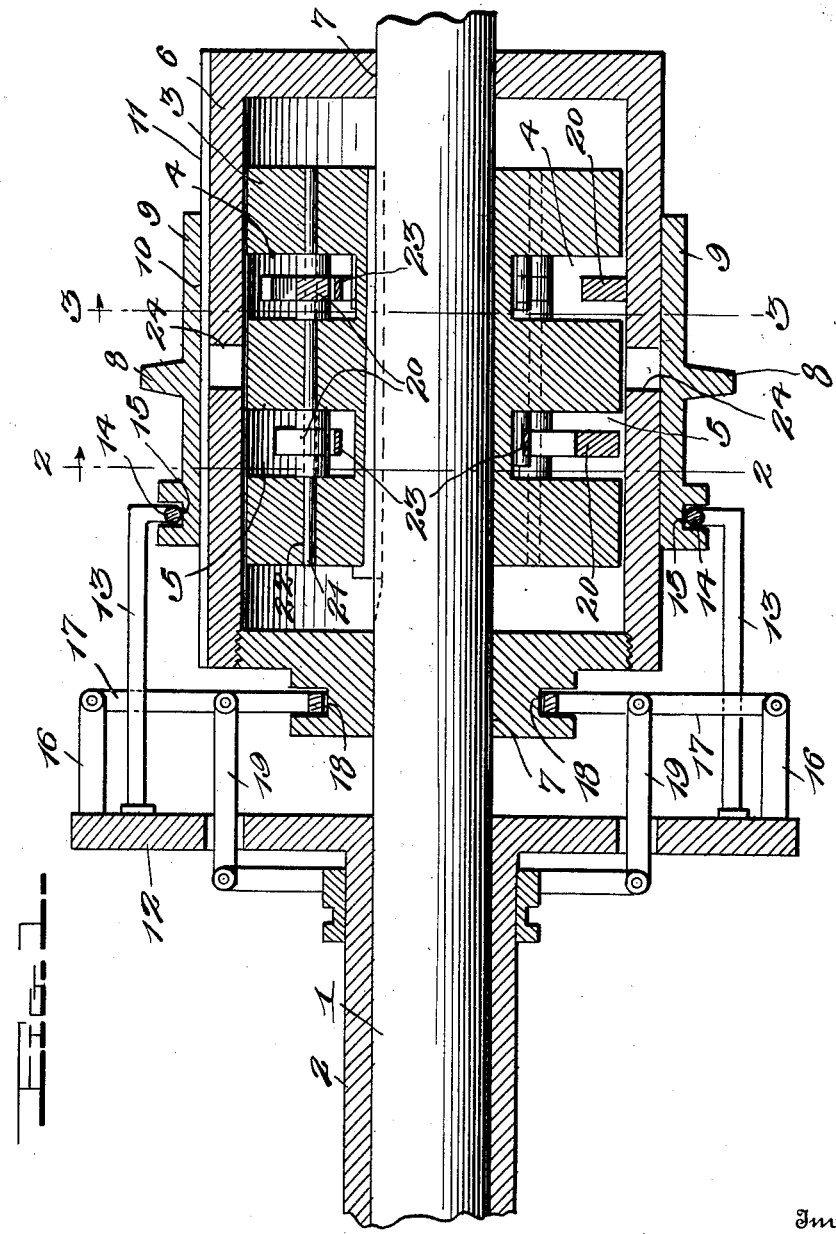
Witnesses
Chas. L. Griesbauer.
A. L. Hind.
Inventor
I. Z. Zelma,
By Watson E. Coleman
Attorney

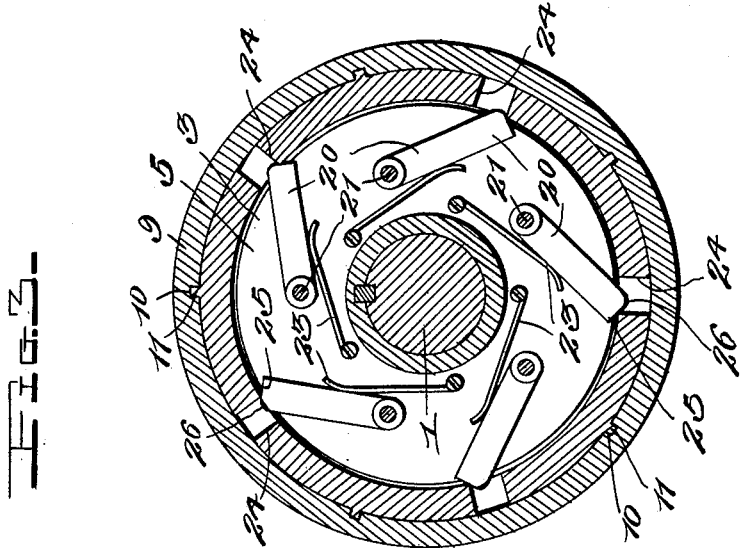
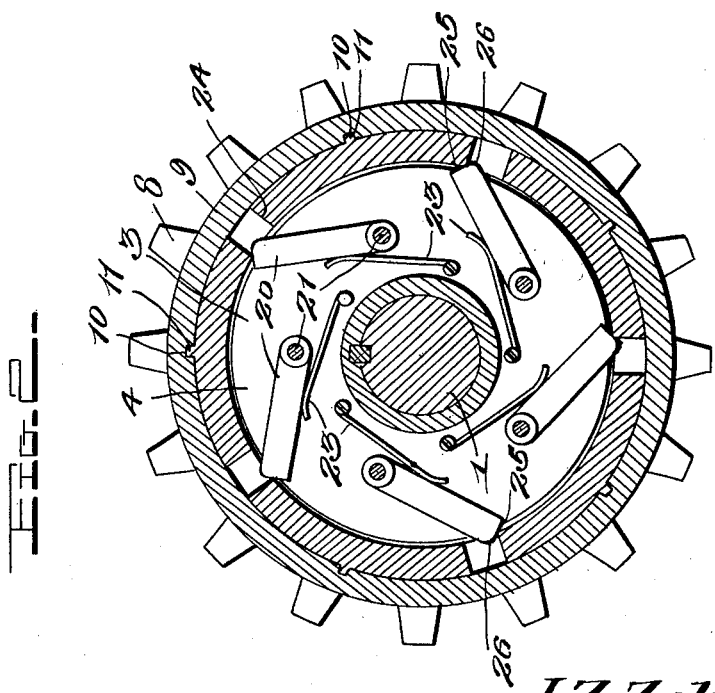

UNITED STATES PATENT OFFICE.

ISIAH ZELL ZELMA, OF ANDALUSIA, ALABAMA.

CLUTCH.

1,058,681. Specification of Letters Patent. Patented Apr. 8, 1913.

Application filed September 14, 1912. Serial No. 720,438.

*To all whom it may concern:*

Be it known that I, ISIAH Z. ZELMA, a citizen of the United States, residing at Andalusia, in the county of Covington and State of Alabama, have invented certain new and useful Improvements in Clutches, of which the following is a specification, reference being had to the accompanying drawings.

This invention comprehends new and useful improvements in clutches and relates more particularly to a power transmission gearing used in conjunction with chain driven motor vehicles.

The invention has for its primary object a simple, durable and efficient construction of a device of this character, the parts of which may be cheaply manufactured, installed and readily assembled, thereby requiring practically no attention to maintain it in proper running order.

This invention also aims generally to improve this class of device to render them more useful and commercially desirable.

With the above and other objects in view this invention consists of the novel details of construction, combination, formation and arrangement of parts as will be hereinafter fully described and particularly pointed out in the appended claims.

In the drawings has been illustrated a simple and preferred form of the invention, it being, however, understood that no limitation is necessarily made to the precise construction and details herein exhibited, but that the right is reserved to make any changes, modifications and alterations to which recourse may be had within the scope of the invention without departing from the spirit or sacrificing the efficiency of the same.

In the said drawings Figure 1 illustrates a horizontal section of a device embodying my invention; Fig. 2 is a vertical transverse section taken on the line 2—2 of Fig. 1 illustrating pawls thrown into engagement when the vehicle is going in a forward direction, and Fig. 3 is a similar section taken on the line 3—3 of Fig. 1 but illustrating the pawls thrown into engagement when the vehicle is traveling in a reverse direction.

Reference now being had to the accompanying drawings wherein corresponding and like parts are designated by like numerals throughout the several views, the numeral 1 indicates the ordinary countershaft of a motor vehicle being journaled within suitable bearings 2 to which is suspended the frame work of the vehicle. This countershaft has mounted adjacent each end thereof my improved differential gearing which will be hereinafter described, each of which is provided with sprocket wheels which are in operative connection with the drive wheels of the vehicle by means of sprocket chains in the usual manner.

My improved differential gearing comprises essentially an enlarged circular member 3 which is keyed upon the countershaft and has formed therein a pair of annular grooves 4 and 5 respectively. A sleeve 6 incloses the cylindrical member 3 and has openings 7 formed in each end thereof through which extends the countershaft 1. This sleeve has an interior diameter substantially the same as that of the exterior diameter of the cylindrical member 3, but the bore formed within the sleeve is of greater length than the said cylindrical portion so the sleeve may slide longitudinally upon the countershaft for a purpose which will be hereinafter described.

A sprocket wheel 8 has formed integral therewith a sleeve 9 and is slidably mounted upon the periphery of the sleeve 6. The inner periphery of the sleeve 9 of the sprocket wheel is provided with a plurality of longitudinally extending grooves 10 in which is adapted to rest longitudinally extending ribs 11 formed upon the outer periphery of the sleeve 6. It is obvious from this construction that the sprocket wheel will be permitted to slide longitudinally upon the periphery of the sleeve 6, but upon the rotation of the said sleeve the sprocket wheel will also be rotated through the connection as described.

Formed integral with the outer end of the bearing 2 is a disk plate 12 from which projects a pair of parallel extending arms 13. The outer free ends of these arms 13 are provided with a ring 14 which is loosely engaged in an annular groove 15 formed adjacent the inner end of the sleeve 9 of the sprocket wheel. This construction provides means for preventing the sprocket wheel from moving longitudinally upon the sleeve 6 but at the same time allows the sprocket wheel to be rotated therewith. A pair of parallel arms 16 extend from the disk plate 12 and have pivotally mounted in their outer ends levers 17 which are adapted to rest within an annular groove 18 formed in one end of a removable head threaded in one end of said sleeve, the other end of said sleeve having an integral wall closing the same. A pair of links 19 are pivotally connected adjacent the medial portion of the said levers 17 and are connected by suitable mechanism not shown which is available to the operator of the motor vehicle so that the sleeve 6 may be moved longitudinally upon the countershaft for a purpose which will be hereinafter more fully described.

A plurality of pawls 20 are pivotally mounted within each of the annular grooves 4 and 5. The inner end of each of these pawls 20 are provided with laterally extending pins 21 which are journaled within the longitudinally extending openings 22 formed within the cylindrical member 3 of the countershaft. A plurality of leaf springs 23 are mounted within each of the recesses 4 and 5 and the free ends of these springs are adapted to rest against and one face adjacent the outer end of each of the pawls 20 which holds the said pawls in an outward position. It is also to be noted with reference to Fig. 3 of the drawings that the pawls 20 extend in opposite directions so that when the vehicle is propelled in a forward direction the pawls 20 in the recess 5 will be thrown in use as will be hereinafter described and upon the reverse direction of the vehicle the pawls within the recess 4 will be thrown in use and the pawls within the recess 5 will be free. Formed within the medial portion of the sleeve 6 is a plurality of circular openings 24 in which the pawls 20 are adapted to rest when rotating the said sleeve. These openings 24 extend radially within the sleeve and there are as many openings as pawls mounted within each of the recesses. Whereas in the drawings I have illustrated five of these pawls in each recess likewise there would be five openings formed within the sleeve 6. The outer or free ends of each of the pawls 20 are squared as at 25 and rounded on one side as at 26. It is to be noted that when the pawls rest within the openings 24 the squared portion of the pawls will rest upon the lowermost edge of the opening thereby causing the sleeve 6 to rotate in the same direction as that of the countershaft, and the beveled edge of the pawls will come in engagement with the lowermost edge of the openings 24 so that when the shaft is rotated in an opposite direction the pawls will rest within the recesses as shown.

It will be seen from the foregoing that when the openings 24 formed within the sleeve 6 lie between the recesses 4 and 5 the pawls 20 will be out of engagement with the said sleeve and thereby permit the countershaft to rotate freely without imparting any motion to the sprocket wheel 8, whereas when the openings 24 formed within the sleeve 6 are brought in alinement with the annular groove 5 the pawls will engage the openings and thereby cause the sleeve to rotate in a forward direction and when the openings 24 are brought in alinement with the recess 4 the pawls mounted within the last mentioned recess will engage the opening thereby forcing the sleeve to rotate in a reverse direction.

It is obvious from the foregoing description taken in connection with the accompanying drawings that the operation and advantages of this transmission gear will be fully understood by those skilled in the art and therefore additional description and operation of the various parts is deemed unnecessary.

What I claim is:

1. In a transmission gearing, the combination of a shaft, a plurality of pivotally mounted pawls arranged on said shaft to rotate therewith, a sleeve longitudinally movable upon the shaft and inclosing said pawls and provided with means to be engaged by the pawls, a driving sprocket carried by said sleeve, and means for shifting the sleeve into position whereby the pawls will engage with the means on the sleeve to lock the sleeve for rotation with the shaft.

2. In a transmission gearing, the combination of a shaft, a plurality of pivotally mounted pawls arranged upon said shaft, a sprocket gear arranged in spaced concentric relation about said shaft, means keyed within the gear for movement longitudinally of the shaft and provided with means for engagement by said pawls, and means for shifting said last named means to position the same for engagement by said pawls whereby the sprocket gear is locked for rotation with the shaft.

3. In a transmission gearing, the combination of a shaft, a member keyed upon said shaft, spring actuated pawls mounted within said member, a sleeve slidably mounted upon said shaft, said sleeve having openings formed therein, and means for operating said sleeve whereby said pawls will engage in said openings substantially as described.

4. In a device of the character described, the combination with a shaft, a member keyed upon said shaft, spring actuated pawls carried by said member, a sleeve slidably mounted upon said shaft, a gear keyed upon the said sleeve, means for moving said sleeve independently of said gear whereby the pawls will engage therewith and lock said sleeve upon the shaft substantially as described.

5. In a device of the character described, the combination of a shaft, a member keyed upon said shaft, of spring actuated pawls mounted within said member, a sleeve slidably mounted upon said shaft, a sprocket wheel keyed upon said sleeve, the said sleeve having a plurality of openings formed therein, and means for operating said sleeve whereby said openings will be brought to position for engagement by said pawls substantially as described.

6. In a device of the character described, the combination of a shaft, a member keyed upon said shaft, said member having annular grooves formed therein, a plurality of spring actuated pawls mounted in each of said grooves, a sleeve slidably mounted upon said shaft, a sprocket wheel carried by said sleeve and means for operating said sleeve whereby the same will be engaged by said pawls and locked upon the shaft.

7. In a device of the character described, the combination with a shaft, of spring actuated pawls carried thereby, a sleeve slidably mounted upon said shaft, a sprocket wheel keyed to and slidably mounted upon said sleeve, a bearing for supporting said shaft, means carried by said bearing for preventing the longitudinal movement of said sprocket wheel, a lever carried by said bearing and pivotally connected to said sleeve, and means for operating said lever whereby said sleeve may be brought into and out of position for engagement by said pawls substantially as described.

In testimony whereof I hereunto affix my signature in the presence of two witnesses.

ISIAH ZELL ZELMA.

Witnesses:
R. N. McLeod,
W. S. Hutchison.

Copies of this patent may be obtained for five cents each, by addressing the "Commissioner of Patents, Washington, D. C."